United States Patent [19]

Gowan, Jr.

[11] Patent Number: 4,954,566

[45] Date of Patent: Sep. 4, 1990

[54] PREPARATION OF POLYMERS WITH PENDANT ORGANIC MOIETIES BOUND THERETO VIA ESTER AND/OR AMIDE BRIDGES

[75] Inventor: John W. Gowan, Jr., Washington, D.C.

[73] Assignee: Westvaco Corporation, New York, N.Y.

[21] Appl. No.: 347,328

[22] Filed: May 4, 1989

[51] Int. Cl.$^5$ ................................................ C08F 8/14
[52] U.S. Cl. ................................... 525/61; 525/328.7; 525/328.8; 525/386
[58] Field of Search ....................... 525/61, 328.2, 386

[56] References Cited

U.S. PATENT DOCUMENTS

| | | | |
|---|---|---|---|
| 3,879,356 | 4/1975 | Pacifici | 525/61 |
| 4,017,520 | 4/1977 | Haferkorn | 260/346.8 M |
| 4,049,634 | 9/1977 | Ko et al. | 525/61 |
| 4,238,358 | 12/1980 | Holy et al. | 252/431 C |
| 4,251,643 | 2/1981 | Harada et al. | 525/61 |
| 4,313,018 | 6/1982 | Holy et al. | 585/269 |
| 4,463,191 | 7/1984 | D'Sidocky et al. | 564/398 |
| 4,666,526 | 5/1987 | Rolf et al. | 106/309 |
| 4,672,051 | 6/1987 | Hso et al. | 502/159 |
| 4,778,847 | 10/1988 | Schornick et al. | 525/61 |

Primary Examiner—Bernard Lipman

[57] ABSTRACT

A one-pot process for preparing a polymer carrying pendant organic residues attached thereto via linking bridges comprises forming an organic solvent solution or suspension of an organic acid, distilling off a water-organic solvent azeotropic solution therefrom to form an organic solvent solution or suspension of the corresponding anhydride of the organic acid, admixing into the organic solvent solution or suspension of the corresponding anhydride a polymer comprising pendant moieties capable of reacting with the —COOH residues of the organic acid derivatized polymer having at least one pendant residue of the organic acid attached thereto via a bridge resulting from the reaction of the —COOH residue of the acid and the pendant reactive residues of the polymer, and free organic acid under conditions permitting the formation of an organic ester or amine-bridged polymer and separating the derivatized polymer from the organic solvent solution of the free organic acid.

20 Claims, No Drawings

PREPARATION OF POLYMERS WITH PENDANT ORGANIC MOIETIES BOUND THERETO VIA ESTER AND/OR AMIDE BRIDGES

This invention is related to co-pending U.S. application Ser. No. 347,260 filed on Mary 4, 1989, entitled "Fluorescent Whitening Agents, Products Comprising the Agent and Method of Use Thereof", U.S. application Ser. No. 401,427 filed on Aug. 31, 1989, entitled "Polyalkylene Imide of High Brightness and Retention Characteristics and Low Toxicity and Method of Increasing Paper Whiteness", U.S. application Ser. No. 426,866 filed on Oct. 26, 1989, entitled "Cellulosic Pulp of High Brightness and Retention Characteristics and Method of Preparing thereof, U.S. application Ser. No. 401,624, filed on Aug. 31, 1989, entitled "Polyacrylamide Whitener of High Brightness and Retention and Low Toxicity and Method of Increasing Paper Whiteness", and U.S. application Ser. No. 462,231, filed on Jan. 9, 1990, entitled "Quaternary Ammonium Fluorescent Whitening Agents, Products thereof. Method of Preparing the Agent and Method of Using thereof", all by the present inventors and assignors.

TECHNICAL FIELD

The invention relates to a one-pot process for preparing a polymeric compound having organic pendant moieties attached thereto via ester and/or amide bridges. The process comprises forming an organic solvent solution of an organic acid, distilling off a water-organic solvent azeotropic solution to obtain an organic solvent solution of the anhydride of said organic acid, admixing into said anhydride solution a polymer selected from the group consisting of polymers comprising hydroxyl and amine pendant moieties under conditions effective to obtain a polymer having pendant organic moieties attached thereto via an ester or amide bridge, and said free organic acid, and separating said polymer having acid or amide bridged pedant moieties from said organic solvent solution of said free organic acid. Depending on the nature of the substrate polymer, the resulting polymer may have the organic moieties attached thereto through —O— and/or —NH— bridges or a combination thereof. A particularly desirable application of the present process is in the preparation of polymer bound fluorescent organic compounds which are useful as whiteners.

BACKGROUND ART

Acids such as anthranilic acid have been anchored to polymers in the past. Examples of these are the anchoring of anthranilic acid to polystyrene which is disclosed in U.S. Pat. Nos. 4,313,018 and 4,238,358. In this prior art process cross-linked polystyrene polymers or beads are first chloromethylated and then anthranilic acid is anchored to the chloromethylated polymer thereof by means of stirring an excess of the acid in the presence of a solvent.

U.S. Pat. No. 4,672,051 disclosed a polymer-bound dehydration catalyst for the conversion of aldehydes to olefins, where the polymer may be divinyl benzene cross-linked polystyrenes. The catalyst is prepared by chloromethylating the divinyl benzene cross-linked macroporous polystyrenes and then reacting the resulting polymer with a suitable reactant.

A polymer bound co-catalyst system useful for reductive alkylation is disclosed in U.S. Pat. No. 4,463,191. This system is a polymer-bound anthranilic acid palladium complex which is used as a catalyst system in conjunction with a sulfonic acid resin also bound thereto. The anthranilic acid polymer complex is prepared by first reacting anthranilic acid with a sytrene/vinyl-benzyl chloride/divinyl benzene resin in an organic solvent at 75° C. for 18 hours, the product is then dried and thereafter reacted with a palladium salt in a dimethylformamide solvent system to obtain the product polymer.

U.S. Pat. No. 4,666,526 disclosed azine pigments which are produced by a method which consists of reacting isatoic anhydride or anthranilic acid esters or amides with an indole derivative. The polymers may be of natural origin such as rubber obtained by chemical modification such as cellulose or viscose, or they may be synthetically produced such as polymers, polyadducts or polycondensated polymers. Examples given by this patent are plastic materials such as polyvinyl chloride, polyvinyl acetate, polyvinyl propionate, polyolefins such as polyethylene or polyamides, superpolyamides, polymers and copolymers of acrylates, methacrylates, acrylonitrile, acrylamide, butadiene and styrene, and polyurethanes and polycarbonates.

Most of the prior art processes are in general complex, and produce by-products which must be separated from the desired ester or amide bridged polymeric product. In addition, the various processes also require elaborate equipment, in many instances involving two or more reaction vessels and are expensive to operate.

Accordingly, there is a need for a simpler, more efficient method of synthesizing pendant ester or amide bridged polymers which preserves the structure of the acid or amide, does not result in waste or by-products and does not require elaborate equipment.

DISCLOSURE OF THE INVENTION

This invention relates to a one-pot process for preparing, e.g., a compound of the formula polymer-(O—CO-organic residue)$_n$,
polymer-(NH—CO-organic residue)$_n$, or

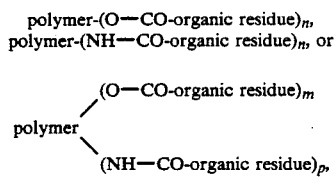

wherein
n is about 0.001 to 0.2,
m is about 0.001 to 0.2, and
p is about 0.001 to 0.2, said process comprising
forming an organic solvent solution or suspension of an organic acid;
distilling off a water-organic solvent azeotropic solution therefrom to form an organic solvent solution or suspension of the corresponding anhydride of the organic acid;
admixing into the organic solvent solution or suspension of said anhydride a polymer selected from the group consisting of polymers comprising pendant residues capable of reacting with the —COOH residue of an organic acid, e.g., hydroxyl pendant moieties, amine pendant moieties and combinations thereof under conditions effective to form an organic ester or organic amine bridges polymer and free organic acid; and separating said bridged polymer from the organic solvent solution or suspension of said free organic acid.

A more complete appreciation of the invention and many of the attendant advantages thereof will be readily perceived as the same becomes better understood by reference to the following detailed description. In addition, other objects, advantages and features of the present invention will become apparent to those skilled in the art from the following discussion.

BEST MODE FOR CARRYING OUT THE INVENTION

This invention arose from a desire to improve on prior art processes for synthesizing polymer-bound organic acids and amides.

The process of the invention is simpler than known processes and provides for the use of milder reaction conditions. In addition, the present process avoids polymer degradation prior to obtaining the final product. SInce the present process is a one-pot process, savings are also attained in the overall cost involved in plant production.

The method of this invention is a simple, efficient method of synthesizing organic ester or amide bridged polymers having pendant organic moieties attached to the polymers through —O— or —NH— bridges. The present method is harmless to the substrate polymer and to the organic acid residue(s) attached thereto. It does not produce waste or by-products and does not require elaborate equipment.

This invention provides a one-pot process for preparing a polymer carrying pendant organic residues attached to the polymer via linking bridges, the process comprising forming an organic solvent solution or suspension of an organic acid;

distilling off a water-organic solvent azeotropic solution therefrom to form an organic solvent solution or suspension of the anhydride corresponding to the organic acid;

admixing into the organic solvent solution or suspension of said anhydride a polymer selected from the group consisting of polymers having pendant residues capable of reacting with the —COOH residue of said organic acid under conditions effective to form a derivatized polymer having a pendant residue(s) of said organic acid attached thereto via a bridge resulting from the reaction of the —COOH residue of said organic acid and the reactive residue of said polymer, and free organic acid; and separating said bridged polymer from the organic solvent solution or suspension of said free organic acid.

In one embodiment thereof, the present invention provides a on-pot process for preparing a compound of the formula polymer-(O—CO-organic residue)$_n$,
polymer-(NH—CO-organic residue)$_n$, or

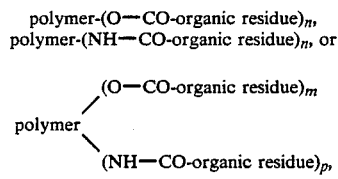

wherein
n is about 0.001 to 0.2, m is about 0.001 to 0.2, and
p is about 0.001 to 0.2, said process comprising forming an organic solvent solution or suspension of an organic acid;

distilling off a water-organic solvent azeotropic solution therefrom to form an organic solvent solution or suspension of the corresponding anhydride of the organic acid;

admixing into the organic solvent solution or suspension of said anhydride a polymer selected from the group consisting of polymers comprising alcohol pendant moieties, pendant amine moieties and combinations thereof under conditions effective to form an organic ester or organic amine bridged polymer and free organic acid; and separating said bridged polymer from the organic solvent solution or suspension of said free organic acid.

The process of the invention may be conducted with polymers of all types and sizes which have pendant moieties capable of reacting with the —COOH residue of an organic acid. Any residue having such reactivity is suitable. Examples of polymer residues are hydroxyl, amine, carboxylic acid and thiol residues. Preferred pending residues are hydroxyl and/or amine moieties. Pendant moieties are defined within the context of this invention as those not forming part of the backbone of the polymer but simply being attached thereto or hanging therefrom.

The polymers may be linear or branched, cross-linked to any degree or they may be co-polymers with other polymers utilized for their particularly special characteristics. The sole requirement is that the pending residues be available in the polymer for reaction with the —COOH residue organic acids.

The polymers may have a broad degree of substitution. Preferred are polymers having substitution coeffficients of about 0.01 to 1, and more preferably about 0.5 to 1. However, polymers with a degree of substitution outside of these ranges may also be utilized. Other substituents may be present in the polymer so long as they do not interfere with the polymers reactively with the acid or if they may be temporarily blocked and later unblocked.

The polymer may be useful in a broad range of molecular weights which will render them useful for the reaction with the organic acid. Examples of polymers which may be placed into a solution or suspension in an organic solvent are polymers of molecular weights of about 1,000 to 1,000,000 daltons, and more preferably about 100,000 to 1,000,000 daltons. However, other molecular weights may also be utilized depending on the amount of branching, cross-linking and the type of polymers.

The degree of cross-linking and co-polymerization may also be broad as long as the polymers are available in solution for reaction with the acid. Preferred are polymers having about 0 to 0.01 cross-linking, and more preferably about 0 to 0.001.

Examples of preferred polymers are hydroxyl (—OH) and/or amine (—NH$_2$) derivatized celluloses, rubbers, polyolefins, polyamines, polyacrylates, polybutadienes, polystyenes, polycarbamates, polyurethanes, polyvinyl alcohol, polyvinyl amine, polyacryl alcohol, polyacryl amine and the like and copolymers thereof. However, other polymers may also be utilized for practicing the present process as seen suitable for specific applications.

The polymer may be supplied in the form of beads, powders, granules, flakes, pellets and in solution. Other forms may also be utilized.

The organic acid may be any organic acid which is capable of forming an anhydride, which in turn is capable of reacting with the reactive groups of the polymer. Examples of acids suitable to be used with this invention are straight chain and branched organic acids such as monocarboxylic acid of two to 30 carbon atoms, aromatic monocarboxylic acids such as benzoic acid, anthranilic acid, napthoic acid, and the like, which may in addition carry other substituents which do not interfere with the reaction of this process. Examples of the acid are ($C_2$–$C_{30}$) alkyl carboxylic acids, ($C_2$–$C_{30}$) alkenyl carboxylic acids, ($C_2$–$C_{30}$) alkenyl carboxylic acids, ($C_7$–$C_{30}$) aryl carboxylic acids, ($C_8$–$C_{50}$) alkylaryl carboxylic acids, ($C_8$–$C_{50}$) alkenylaryl carboxylic acid, ($C_8$–$C_{50}$) alkylaryl carboxylic acid and derivatives thereof, which may further comprise O, N, S or halogen. When the acid contains reactive moieties, said moieties must be protected during the admixing step and they may be deprotected afterwards. In one preferred embodiment the organic acid is a fluorescent acid. Examples of these fluorescent acids are anthranilic acid, N-methylanthranilic acid, N,N-dimethylanthranilic acid and the like. The resulting derivatized polymers have been found useful as whiteners in applications such as the paper industry. Acids other than the ones described above may also be utilized under the mild conditions of this process. Other substituents may be present in the acid as long as they are not reactive towards hydroxyl and/or amine moieties. Examples of such substituents are ethers, thioethers, amides and thioamides. However, other which comply with the above requirement may also be present in the acid residue.

The process of the invention may be conducted in the presence of a variety of organic solvents which do not intervene in the reaction between the polymer and the acid. Essentially, the function of the organic solvent is to suspend and/or dissolve the substrate components (polymer and acid) in order to permit contacts therebetween for the reaction to proceed. In addition, the organic solvent may be capable of forming an azeotrope with water in order that it may be distilled off to concentrate the solution and aid the formation of the organic acid anhydride. Other desirable characteristics of the organic solvent relate to its boiling point which should be such that the solvent remains in a liquid state in the range of temperatures utilized by this process except the distillation step. In addition, the solvent should be able to suspend and/or dissolve the free organic acid but not to a great extent the derivatized polymer, thus permitting an easy separation thereof from the reaction mixture.

In a preferred embodiment the solvent used in the process is a low polarity solvent lacking moieties capable of interfering with the on-going reaction. Examples of undesirable solvent substituents are —COOH, —OH, —NH$_2$, anhydrides, esters and acid halides, among others. Examples of suitable solvents are aromatic solvents such as toluene, xylene, dibutylether, chlorobenzene and anisole or mixtures thereof. Polar solvents are in general suitable. However, other solvents may also be utilized.

The present process may be conducted at virtually any temperature which will not decompose the substrates and/or products involved, or that will not evaporate the solvent utilized. Preferred temperatures include about 50 to 150° C., and more preferred are about 75 to 100° C. However, the choice of temperature for the formation of the anhydride and/or the reaction of the polymer with the anhydride may be tailored to the specific substrates utilized. Typically, however, the reaction may be conducted at room temperature except for the distillation of the water-organic solvent azeotrope, during which step the temperature must be increased to permit the elimination of at least part of the azeotropic mixtures from the solvent mixture. The azeotropic temperatures of water-solvent mixtures are known or can be very easily determined in the laboratory by an artisan.

In the admixing step the anhydride is split, with one half of the molecule going to form the polymer-bound organic acid and the other half remaining free in solution as the organic acid.

The various steps encompassed by this process are conducted for a time effective to obtain the indicated products. Typically the period of time suitable for the formation of the anhydride may vary from about 30 min to 48 hrs, and preferably about 60 min to 6 hrs, and the reaction of the anhydride with the polymer may take about 15 min to 24 hrs, and more preferably about 30 min to about 4 hrs to attain completion. However, if lower yields are acceptable lesser times are also suitable.

The separation of the derivatized polymer from the free organic acid in solution may be conducted by a variety of techniques. Filtration is a simple one which permits the separation of the derivatized polymer from the remaining organic acid in solution. The latter may, in turn, be returned to the reactor where the process is conducted. The separation may also be conducted by decantation and/or centrifugation as is known in the art. Preferred is filtration because of its simplicity and the fact that it does not require complex apparatuses.

In one preferred embodiment of the invention the acid is a fluorescent molecule, which may in addition to the COOH moiety contain conjugated double bonds, aromatic or amine moieties. A particularly preferred acid is one that has a —NH$_2$ substituent such as anthranilic acid.

In a preferred embodiment of the process of this invention the distillation step is conducted in the presence of a catalyst which aids the formation of the organic acid anhydride. These catalysts are known in the art and need not be described herein. Particularly preferred catalysts are acid catalyst such as P-toluenesulfonic acid. However, other catalysts may also be utilized.

When the acid utilized in the invention is a fluorescent acid, the derivatized polymer may be utilized as a fluorescent whitener for a variety of products. This is particularly the case of polymers derivatized with anthranilic acid which are disclosed in one of the co-pending U.S. applications which is cross-referenced above, and the entire contents of which are incorporated herein by reference to show typical examples of derivatized polymers and the manner in which they may be utilized. The utilization of the fluorescent acid-derivatized polymer may be conducted as described herein.

Typically, the process of the invention may be conducted under the above conditions and it will result in a derivatized polymer being obtained in an about 10 wt. % yield or greater, and sometimes greater than about 20 wt. % based on the original polymer weight.

The resulting polymer typically has an acid derivatization coefficient of about 0.01 to 1, and preferably about 0.5 to 1, with respect to the total content of the reactive groups in the polymer.

Typically, the organic acid is admixed with the organic solvent in a proportion of about 0.1 to 1 moles per liter, and more preferably about 0.2 to 0.5 moles per liter.

The distillation step may be conducted for a period of time resulting in a reduction is volume of the solution of about 50% to 90%, and preferably about 60% to 75%.

In the admixing step the proportion anhydride:-polymer:solvent may be about 1:20:500 to 1:0.1:50, and preferably about 1:5:200 to 1:0.2:200 in moles:moles:liters.

Having now generally described this invention, the same will be better understood by reference to certain specific examples which are included herein for purposes of illustration and are not intended to be limiting of the invention or any embodiment thereof, unless so specified.

EXAMPLE

The utility of this process is demonstrated herein with the attachment of N-acetylanthranilic acid to polyvinyl alcohol.

5 gm N-acetylanthranilic acid is dissolved in 200 ml of toluene in a 500 ml round bottom flask fitted with a Dean Stark trap, condenser, electric heating mantle, and magnetic stirrer. p-toluenesulfonic acid (0.05 gm) is added, and the mixture is refluxed. Thin layer chromatography (TLC) indicates total conversion of the acid to the corresponding anhydride within 2 hours.

Polyvinyl alcohol is then added (10 gm) and the mixture was stirred at reflux for 4 hours. TLC indicates the gradual disappearance of the anhydride.

The polymer is removed by filtration, washed with chloroform to remove absorbed, non-bonded reagents, and then tested for fluorescent characteristics. Irradiation with 254 nm UV light produces strong fluorescence. The filtered toluene solution is then returned to the flask, 1 gm Nacetylanthranilic acid is added thereto and the anhydride is formed again, as above. During the anhydride formation the water collected in the Dean-Stark trap (0.6 ml) conforms to the theoretical amount (0.5 ml).

The invention now being fully described, it will be apparent to one of ordinary skill in the art that many changes and modifications can be made thereto without departing from the spirit or scope of the invention as set forth herein.

I claim:

1. A one-pot process for preparing a polymer carrying pendant organic residues attached to the polymer via a linking bridges, comprising
    forming an organic solvent solution or suspension of an organic acid, the solvent being capable of forming a water-solvent azeotropic solution;
    combining 2 molecules of the acid to form the corresponding organic acid anhydride and water and distilling off a water-solvent azeotropic solution from an organic solvent solution or suspension of the anhydride;
    admixing into the solvent solution or suspension of said anhydride a polymer selected from the group consisting of polymers having pendant residues capable of reacting with a —COOH or a =(CO)$_2$O residue under conditions effective to form free organic acid and a derivatized polymer, said polymer having a pendant residue(s) of said anhydride attached thereto via a bridge resulting from the reaction of the =(CO)$_2$O residue of the anhydride and the residue of the polymer; and
    separating the derivatized polymer from the free organic acid solution or suspension.

2. The one-pot process of claim 1, wherein
the polymer carrying pendant organic residues attached thereto via linking bridges is a polymer-(O—CO-organic residue)$_n$,
polymer-(NH—CO-organic residue)$_n$, or

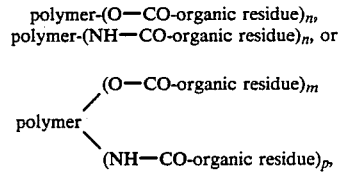

wherein
    n is about 0.001 to 0.2;
    m is about 0.001 to 0.2;
    p is about 0.001 to 0.2; and
    the polymer is selected from the group consisting of polymers having pendant hydroxyl and amine moieties and combinations thereof.

3. The method of claim 2, wherein
    the polymer has pendant hydroxyl moieties; and
    the acid is a (C$_8$–C$_{50}$)alkyl aryl, (C$_8$–C$_{50}$)alkenyl aryl or (C$_8$–C$_{50}$)alkynyl aryl carboxylic acid or a derivative thereof further comprising O,N,S or halogen, wherein when the acid contains a further reactive substituent, the substituent is protected during the admixing step.

4. The process of claim 1, wherein
    the polymer is selected from the group consisting of polyvinyl alcohol and polyacrylamide.

5. The process of claim 4, wherein
    the polymer is polyvinyl alcohol.

6. The process of claim 1, wherein
    the polymer has a molecular weight of about 1,000 to 1,000,000 daltons.

7. The process of claim 1, wherein
    the acid is selected from the group consisting of (C$_2$–C$_{20}$)alkyl carboxylic acids, (C$_2$–C$_{20}$)alkenyl carboxylic acids, (C$_2$–C$_{20}$)alkenyl carboxylic acids, (C$_7$–C$_{30}$)arylcarboxylic acids, (C$_8$–C$_{50}$)alkyl- aryl carboxylic acids, (C$_8$–C$_{50}$)alkenylaryl carboxylic acids, (C$_8$–C$_{50}$)alkynylaryl carboxylic acids and derivatives thereof further comprising O, N, S or halogen, wherein when the acid contains a further reactive substituent the substituent is protected during the admixing step.

8. The method of claim 7, wherein
the acid is an aryl carboxylic acid further comprising an —NH$_2$ residue.

9. The process of claim 8, wherein
the acid is anthranilic acid.

10. The process of claim 1, wherein
the organic acid is fluorescent.

11. The process of claim 1, wherein
the distillation step is conducted in the presence of a catalyst.

12. The process of claim 11, wherein
the catalyst is selected from the group consisting of acid catalysts.

13. The process of claim 1, wherein
the forming step is conducted at a temperature of about 50 to 150° C.

14. The process of claim 1, wherein the admixing step is conducted at a temperature of about 25 to 100° C.

15. The process of claim 1, wherein
the separation step is conducted by filtration or decantation.

16. The process of claim 1, wherein
the separation step and the solution forming steps are conducted with a low polarity solvent.

17. The process of claim 1, wherein
the solvent lacks moieties selected from the group consisting of —COOH, —OH, —NH₂, —SH, —NCO and

18. The process of claim 16, wherein
the solvent is a hydrocarbon or mixtures thereof.

19. The process of claim 1, wherein
the organic acid and the solvent are present in the forming step in a proportion of about 0.2 to 0.5 moles per liter.

20. The process of claim 1, wherein
the proportion organic anhydride:polymer:solvent in the admixing step is about 1:20:500 to 1:0:50 moles:moles:liter.

* * * * *